United States Patent
Crow et al.

(10) Patent No.: US 7,085,781 B2
(45) Date of Patent: *Aug. 1, 2006

(54) MULTI-VOLUME EXTENT BASED FILE SYSTEM

(75) Inventors: Preston F. Crow, Ashland, MA (US); Robert S. Mason, Jr., Mendon, MA (US); Steven T. McClure, Northboro, MA (US); Susan C. Nagy, Waltham, MA (US); Richard G. Wheeler, Belmont, MA (US)

(73) Assignee: EMC Corporation, Hopkinton, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/720,629

(22) Filed: Nov. 24, 2003

(65) Prior Publication Data

US 2004/0105332 A1    Jun. 3, 2004

Related U.S. Application Data

(62) Division of application No. 09/301,177, filed on Apr. 28, 1999, now Pat. No. 6,654,772.

(51) Int. Cl.
    *G06F 17/30* (2006.01)
(52) U.S. Cl. .................. 707/201; 707/202; 707/203; 709/217
(58) Field of Classification Search ........ 707/201–205, 707/100; 711/171, 114, 157; 365/202
See application file for complete search history.

(56) References Cited

U.S. PATENT DOCUMENTS

| | | | | |
|---|---|---|---|---|
| 4,761,737 A * | 8/1988 | Duvall et al. | ............... | 711/209 |
| 5,021,946 A * | 6/1991 | Korty | ............... | 707/205 |
| 5,175,852 A * | 12/1992 | Johnson et al. | ............... | 707/8 |
| 5,454,103 A * | 9/1995 | Coverston et al. | ............... | 707/205 |
| 5,666,532 A * | 9/1997 | Saks et al. | ............... | 707/205 |
| 5,764,972 A * | 6/1998 | Crouse et al. | ............... | 707/204 |
| 5,875,444 A * | 2/1999 | Hughes | ............... | 707/2 |
| 5,897,661 A * | 4/1999 | Baranovsky et al. | ............... | 711/170 |
| 5,991,862 A * | 11/1999 | Ruane | ............... | 711/202 |
| 6,023,706 A * | 2/2000 | Schmuck et al. | ............... | 707/200 |
| 6,065,037 A * | 5/2000 | Hitz et al. | ............... | 709/200 |
| 6,353,837 B1 * | 3/2002 | Blumenau | ............... | 707/205 |
| 6,654,772 B1 * | 11/2003 | Crow et al. | ............... | 707/205 |
| 6,697,846 B1 * | 2/2004 | Soltis | ............... | 709/217 |
| 2004/0098547 A1 * | 5/2004 | Ofek et al. | ............... | 711/162 |
| 2004/0133570 A1 * | 7/2004 | Soltis | ............... | 707/3 |

* cited by examiner

*Primary Examiner*—Jeffrey Gaffin
*Assistant Examiner*—Hassan Mahmoudi
(74) *Attorney, Agent, or Firm*—Krishnendu Gupta; Scott A. Ouellette (57) ABSTRACT

A memory storage device has a file storage operating system which uses an inode to record and find segments of each data file. The inode includes a plurality of rows. A portion of the rows are written with direct extents pointing to data blocks storing portions of file segments. At least two of the extents point to data blocks having addresses in different logical volumes.

12 Claims, 12 Drawing Sheets

Extent = {start address pointer, length, flags}
             6 bytes              4 bytes  2 bytes

FIG. 6A

Start address = {Block pointer, Logical Volume pointer}
                        4 bytes              2 bytes length = {Number of data blocks} flags = {locked; zeroed; hole, direct, or indirect}
          Y/N     Y/N            selection

MULTI-VOLUME EXTENT BASED FILE SYSTEM

This is a divisional patent application (and claims the benefit of priority under 35 USC 120) of U.S. patent application Ser. No. 09/301,177 now U.S. Pat. No. 6,654,772, filed Apr. 28, 1999.

BACKGROUND OF THE INVENTION

This application relates generally to file systems, and more particularly, to extent based file systems.

Computer systems manipulate and store data files that often include a sequence of file segments. Each file segment occupies a consecutive sequence of physical storage blocks. The different file segments may, however, be stored at widely separated physical storage locations.

A file system makes the details of data storage of data files simpler for software application programs. The file system enables high-level applications to address stored data through abstract concepts such as directory name, file name, and offset rather than through actual physical storage addresses. This system for addressing data storage makes software applications less dependent on how data is physically stored so that the applications are less tied to the physical storage system and more portable.

Figure 1:
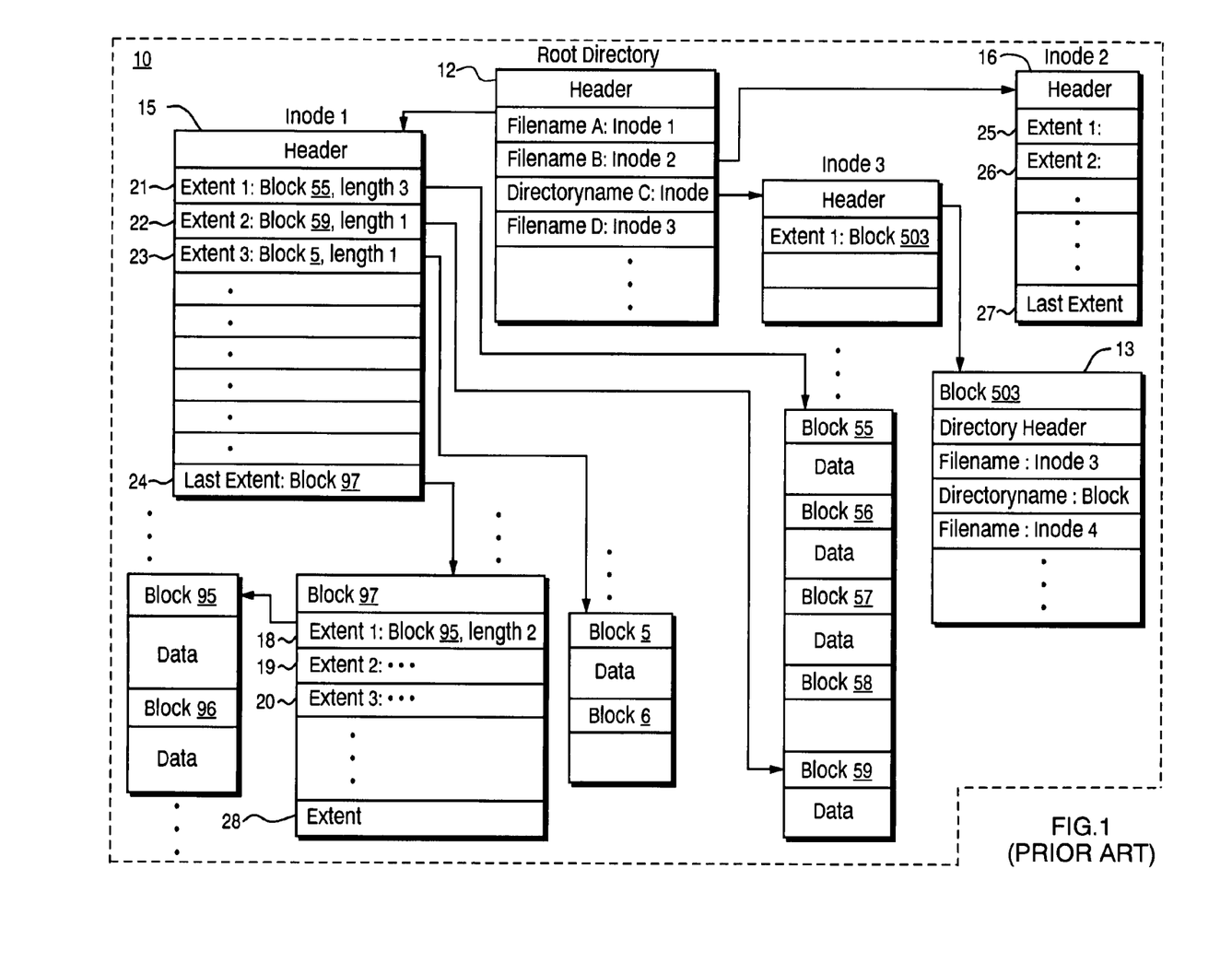
FIG. 1 illustrates physical structures used by a prior art file system to abstract data storage.

FIG. 1 illustrates a file system that UNIX based systems employ to translate between abstract file names and physical storage addresses. The file system performs translations with the aid of two types of structures, which are stored on a data storage device 10. The first type of structure is a directory 12, which maps abstract directory names and file names to other directories 13 and index nodes (inodes) 15, 16, respectively. The second type of structure is the mode 15, 16, which maps abstract file segments to the physical data blocks 17, 17a, 17b storing the segments.

The indodes 15, 16 include lists of extents 21–27. By definition, the consecutive extents 21–24 of each inode 15 correspond to consecutive file segments and indicate the storage addresses of the segments by an address pointer and a length. The address pointer indicates the physical address of the first data block, for example, blocks 55, 59, storing the file segment. The length indicates the number of consecutive data blocks assigned to store the segment. For example, the extent 21, which points to the address of the data block 55 and has length three, and includes the three data blocks 55–57.

Each inode 15, 16 can also include one or more special extents 24, 27 stored at special positions of the inode 15, 16, that is, the last rows allocated in the inodes for extents. The special extents 24, 27 point to data blocks that store additional extents. For example, the special extent 24 points to the data block 97 that stores additional extents 18–20, 28. The additional extents 18–20 point to strings of data blocks 95 storing segments, and enable extending the end of the file to increase the associated file's size. The last extent 28 of the data block 95 can also be a special extent thereby providing for further extensions of the end of the file.

Figure 2:
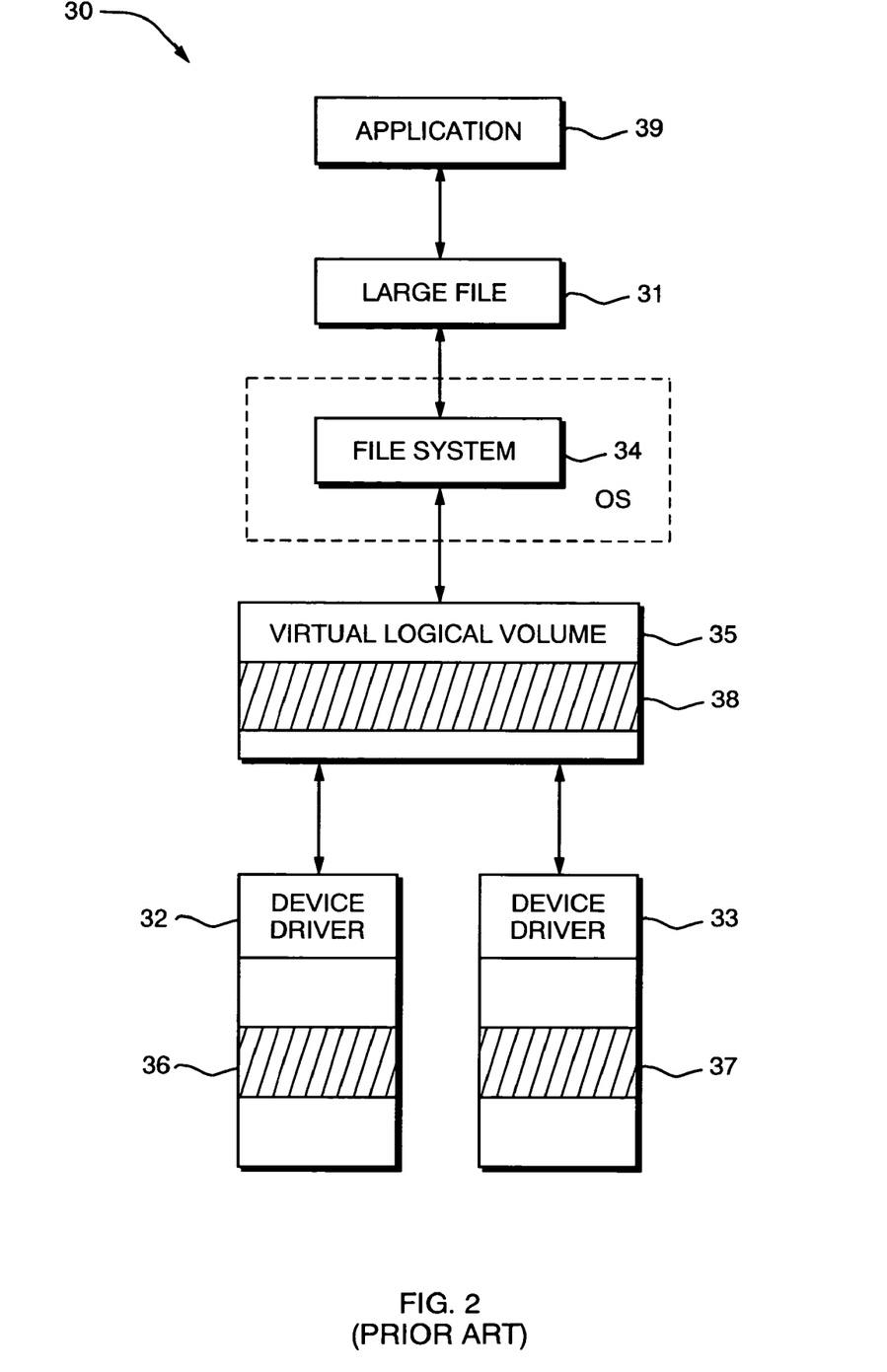
FIG. 2 schematically illustrates a prior art method for abstracting large files.

Some file systems translate between large files and physical storage. FIG. 2 illustrates a file system 30 capable of translating an abstract file 31 to data blocks stored on multiple physical disks 32, 33. To provide enough storage space for the large file 31, the file system 34 interacts with an intermediate abstraction layer, a virtual logical volume 35, which translates physical space 36–37 in the separate physical disks 32–33 into a single virtual space 38. Then, software application 39, which accesses the file 31, sees the single large virtual volume 35 and is unaware of the separate devices 32–33.

One objective of the present invention is to provide a file system that gives a more flexible method for extending an existing file.

Another objective of the present invention is to provide a file system adapted to storing large files.

SUMMARY OF THE INVENTION

In a first aspect, the invention provides a memory storage device having an operating system, which uses one inode to record and find segments of a data file. Each inode has a plurality of rows. Part of the rows are written with direct extents, which point to data blocks storing portions of file segments. At least two of the extents point to data blocks whose addresses are in different logical volumes.

In a second aspect, the invention provides a memory storage device, which uses at least one inode for accessing file segments in storage devices. Each inode has a plurality of rows. A portion of the rows store extents pointing to data blocks. Each extent has a field to indicate whether the extent is an indirect extent or a direct extent and a field for a logical volume pointer.

In a third aspect, the invention provides a method for storing data files, which is performed by an operating system stored in a memory device. The method includes steps for writing extents to an inode assigned to the file, writing data to first and second data blocks, inserting an indirect extent in the inode between first and second ones of the extents, and writing a third extent to a third data block. The first and second ones of the extents point to the first and second data blocks. The indirect extent points to the third data block. The third extent points to a data block storing a segment of the file.

In a fourth aspect, the invention provides a distributed storage system. The storage system includes a global cache memory, a plurality of processors coupled to the global cache memory, and a plurality of data storage devices coupled to the global cache memory. Each processor has a local memory for storing an operating system. The devices and processors are capable of communicating by posting messages to each other in the cache memory. Each of the devices has a processor and local memory storing an operating system. Each operating system includes an extent based file system for abstracting file names to physical data blocks in the storage devices by assigning an inode to each file. Each inode adapted to store extents having a field to pointing to a logical volume.

BRIEF DESCRIPTION OF THE DRAWINGS

Other objectives, features, and advantages of the invention will be apparent from the following description taken together with the drawings, in which.

DESCRIPTION OF THE PREFERRED EMBODIMENTS

Figure 3:
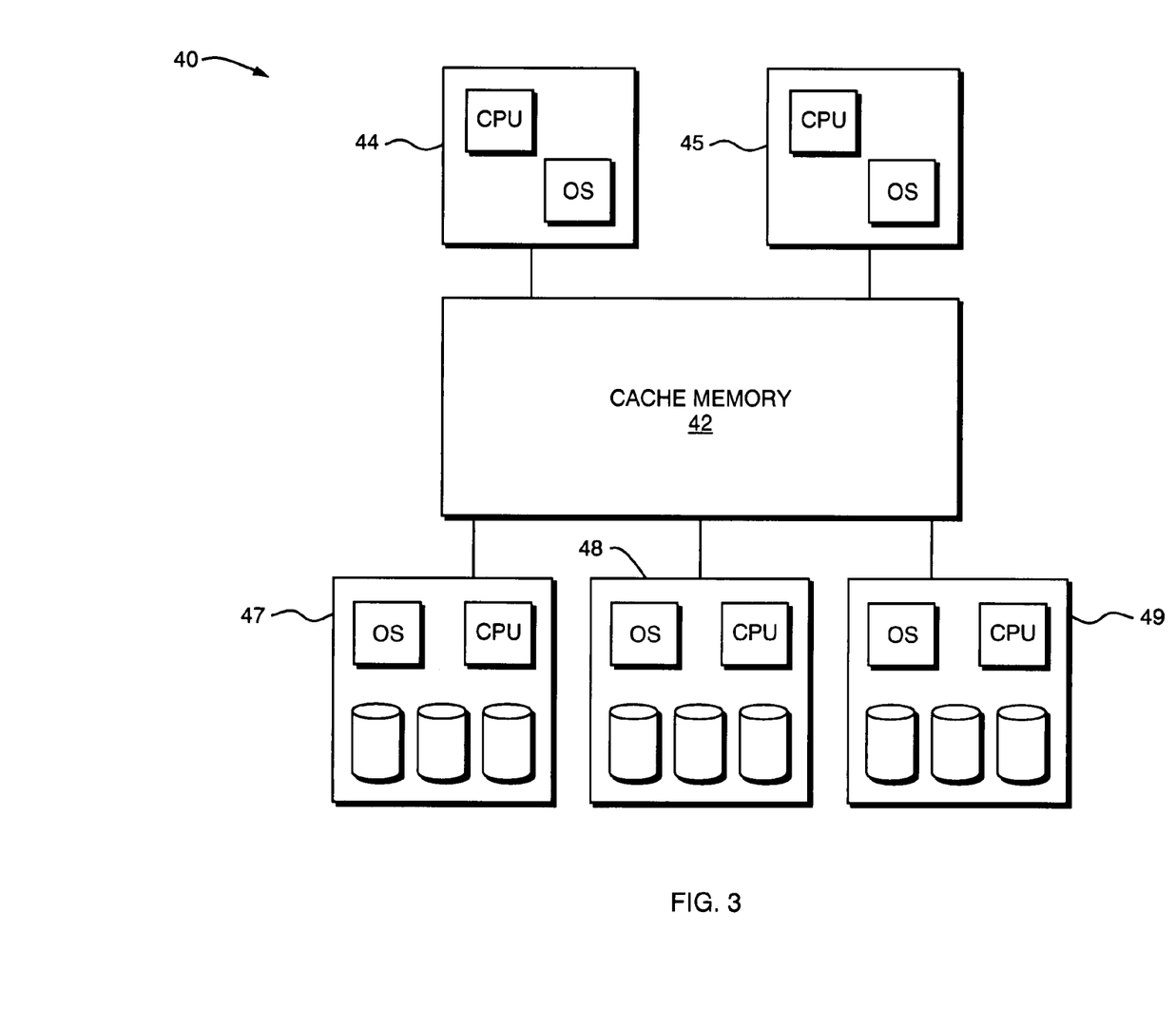
FIG. 3 illustrates a distributed storage system having a global cache memory.

FIG. 3 illustrates a distributed storage system 40 in which a global cache memory 42 couples to a plurality of processors 44, 45 and storage device drivers 47–49. Each processor 44, 45 and driver 47–49 has a central processing unit (CPU) to control input/output (I/O) with the global cache memory 42 and permanent memory, for example, ROM or EPROM, storing microcode. The microcode includes an operating system (OS) with a file system. The various device drivers 47–49 may have multiple storage disks arranged, for example, in RAID configurations.

The global cache memory 42 provides a symmetric environment for communications between the processors 44, 45 and the drivers 47–49. The processors 44, 45 and drivers 47–49 send requests to and respond to requests from the other processors 44, 45 and drivers 47–49 by writing messages in predetermined locations of the global cache memory 42. The messages identify the intended recipients by physical addresses. The recipients recognize and read the messages posted in the global cache memory 42. Thus, the global cache memory 42 acts like a blackboard on which the processors 44, 45 and drivers 47–49, which recognize each other as separate logical devices, write messages to each other.

Figure 4:
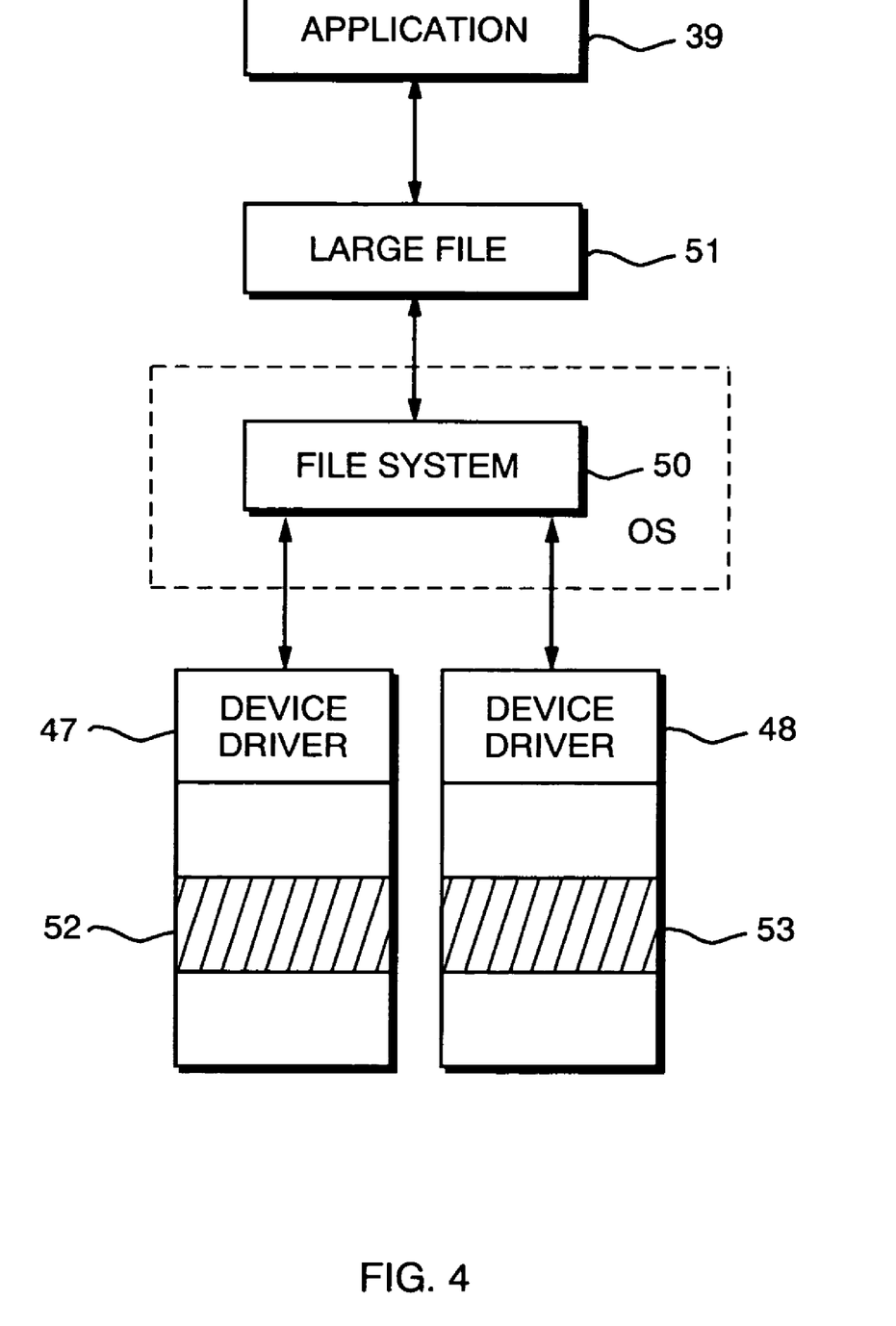
FIG. 4 illustrates how the file system of the distributed storage system of FIG. 3 translates large files to physical storage volumes.

FIG. 4 illustrates how the file system 50 on each processor 44, 45 and driver 47–49 of FIG. 3 can map file segments of one file to different logical devices and volumes. For example, the file system 50 maps different segments of the file 51 to different ones of the drivers 47–48. The file system 50 translates the abstract file name and offset for the file 51 directly to physical segments 52, 53 stored on the different drivers 47–48 without creating a virtual volume, unlike the file system 34 shown in FIG. 2. Since the file system identifies the driver 47–48 storing each segment 52, 53, the processors 44–45 and drivers 47–49 address those drivers 47–48 directly to manipulate the segments of the file 51.

Figure 5:
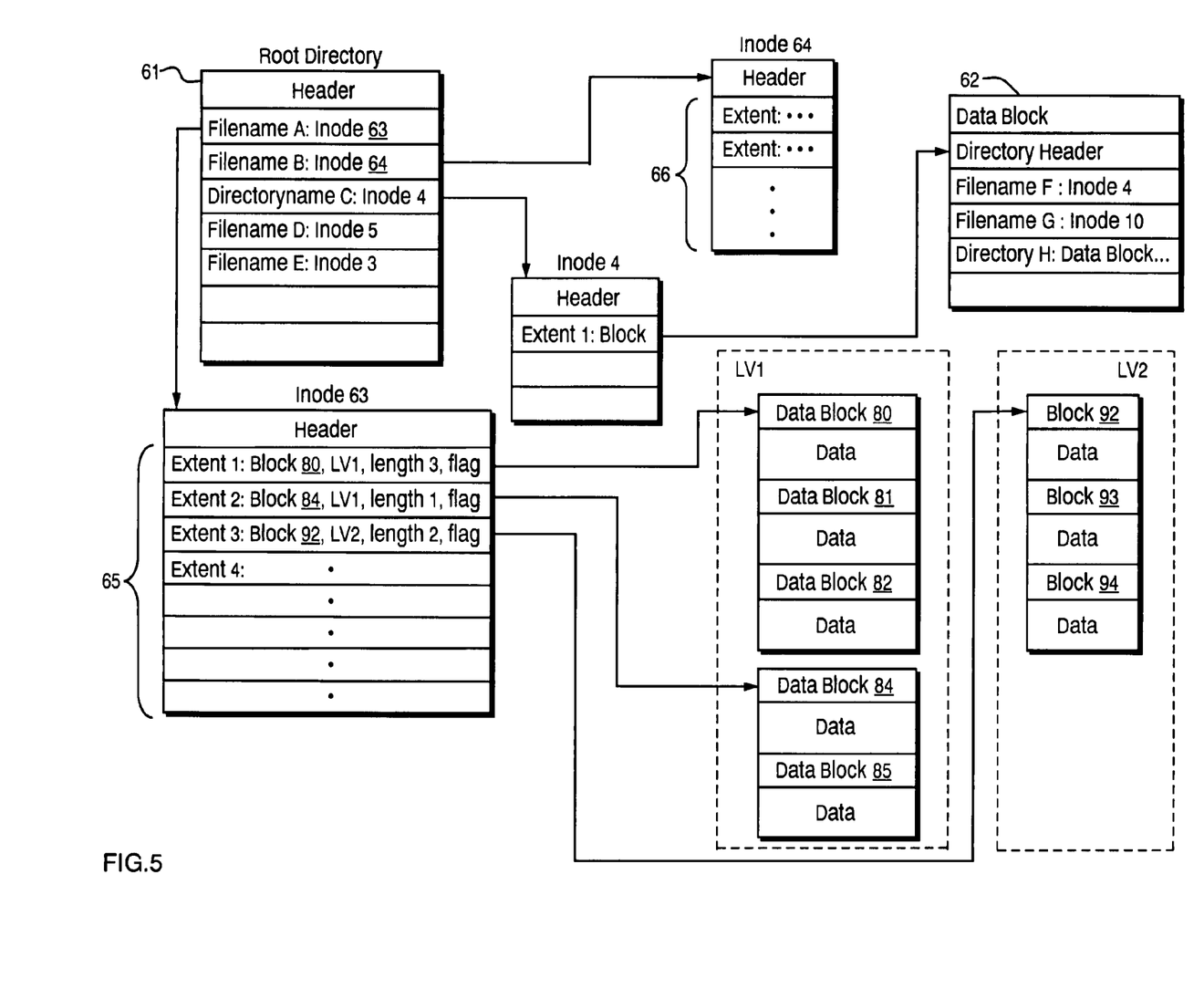
FIG. 5 illustrates physical structures used by the file system of FIGS. 3 and 4.

FIG. 5 illustrates physical structures that the file system of FIG. 3 uses to translate between abstract files and physical data blocks. The physical structures include directories 61, 62 and inodes 63, 64. Each directory 61 translates abstract file names and directory names to physical addresses of inodes 63, 64 and directory 62, respectively. Each inode 63, 64 stores a list of extents 65–66, which map consecutive file segments to strings of physical data blocks 80–82, 84–85, 92–94.

The physical directories 61, 62 and inodes 63, 64 are stored in the global cache memory 42. Copies of the relevant directories 61, 62 and/or inodes 63, 64 may also be stored locally to volatile memory of the processors 44, 45 and drivers 47–49. The locally stored copies speed up I/O by the various local operating systems.

Each data block 80–82, 84–85, 92–94 has the same size, for example, 4K bytes. Nevertheless, the extents 65–66 can map file segments of different sizes to physical storage locations. To handle file segments of different sizes, each extent has a length field that indicates the number of data blocks in the string of data blocks that stores the associated file segment.

The various extents 65, 66 of each inode 63, 64 may map to data blocks 80–82, 84–85, 92–94 of different logical volumes LV1, LV2. For example, the extents 1 and 2 of the mode 63 map to the data blocks 80–82, 84 in a first logical volume LV1, and the extent 3 of the same inode 63 maps to data blocks 92–93 in a second logical volume LV2. The different extents 65, 66 can map different segments of a single abstract file to different ones of the drivers 47–49 and to different physical disks and partitions therein.

Figure 6A:
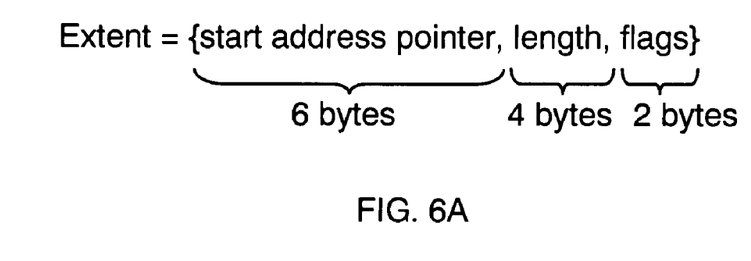
FIGS. 6A and 6B illustrate the format of the extents in the inode of FIG. 5.
Figure 6B:
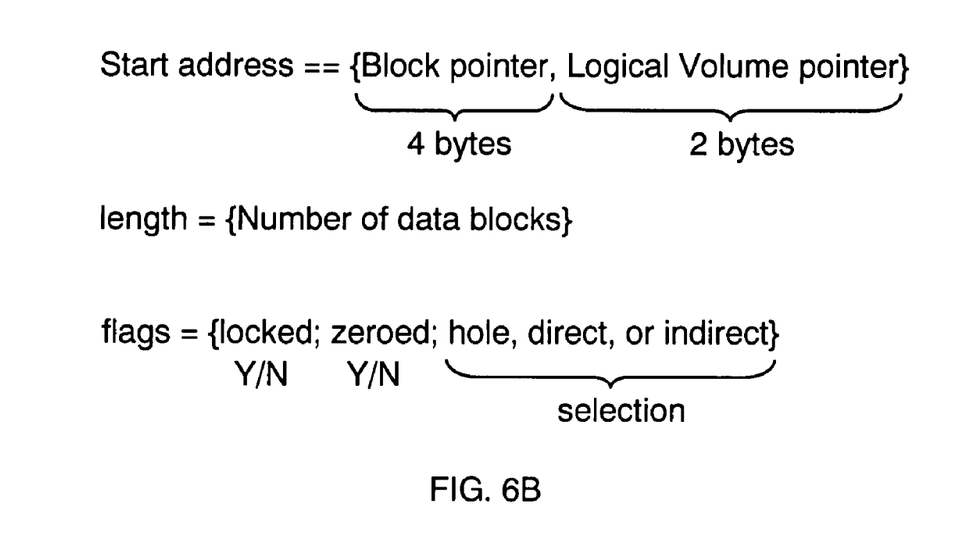

FIGS. 6A and 6B illustrate the format of the extents in the inodes 63, 64 of FIG. 5. Each extent of the illustrated embodiment has three fields including an address pointer field, a length field, and a flag field.

The address pointer field indicates both a logical volume and a physical offset of a data block in the logical volume. In one embodiment, the pointer fields for the logical volume and the data block therein are 2 bytes and 4 bytes long, respectively. For this field size and data blocks of 32 kilobytes, the extent fields can identify about $140 \times 10^{12}$ bytes of data in each of about 64K different logical volumes. Thus, the file system of the distributed storage system 40 can handle very large files.

The length field indicates the number of consecutive data blocks in the string assigned to a file segment. In the above-described embodiment, the length field is 4 bytes long and thus, distinguishes a wide range of string lengths. If the values of the length field equal the number of data blocks in the associated string, strings can include from one data block to about $4 \times 10^9$ data blocks.

In the above-described embodiment, the flag field uses two bytes to characterize types of data blocks pointed to by an extent. A first portion of the flag field indicates whether the data blocks are locked or unlocked, that is, available or unavailable. The locked designation indicates that access to the data blocks is limited. The processors 44–45 and drivers 47–49 may change the flag field of an extent to the locked designation while manipulating data in the associated data blocks so that other devices do not access the data blocks in parallel. A second portion of the flag field indicates whether empty data blocks have been zeroed. By using the not zeroed designation, the file system can allocate a data block to a file without zeroing the block beforehand. If a subsequent access writes the entire data block, the block will not have to be zeroed saving processing time. A third portion of the flag field categorizes the data type stored in a data block into one of three types, that is, real file data, non-data, or extents.

Figure 7:
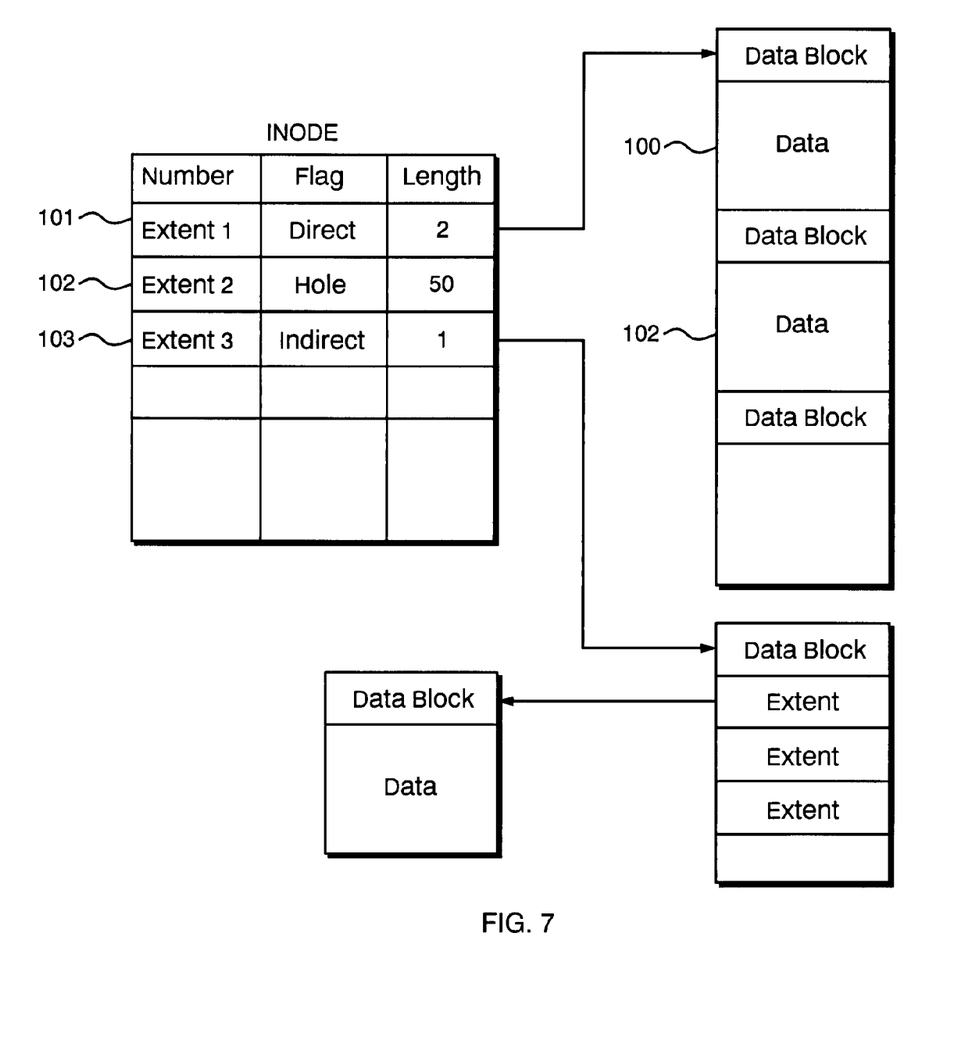
FIG. 7 illustrates the use of direct, hole, and indirect extents by the file system of FIGS. 3, 5, 6A and GB.

FIG. 7 illustrates the relationship between the third portion of the flag field and the data type of the data blocks pointed to by an extent. if data blocks 100 have real data for the associated filed, the third portion of the flag field indicates that the associated extent 101 is a direct extent. if the data blocks are not yet allocated, the third portion of the flag field indicates that the associated extent 102 is a hole extent. The hold extent is useful for reserving a range of offsets of a file without consuming disk space to back up the offsets. Finally, if the data blocks, for example data block 105, store more extents, the third portion of the flag field indicates that the extent, here extent 103, is an indirect extent.

Figure 8A:
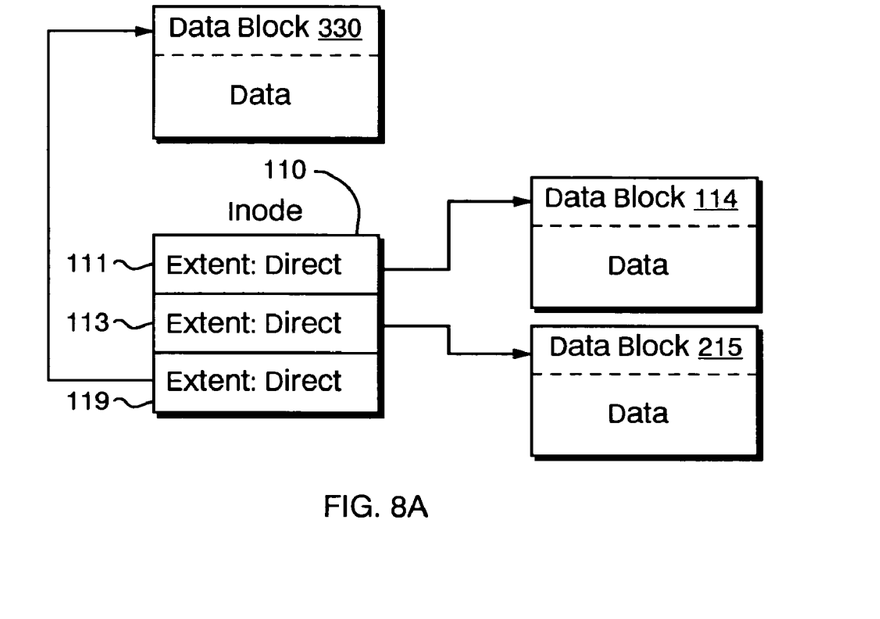
FIGS. 8A and 8B illustrate how indirect extents enable expansions of a file at middle points.
Figure 8B:
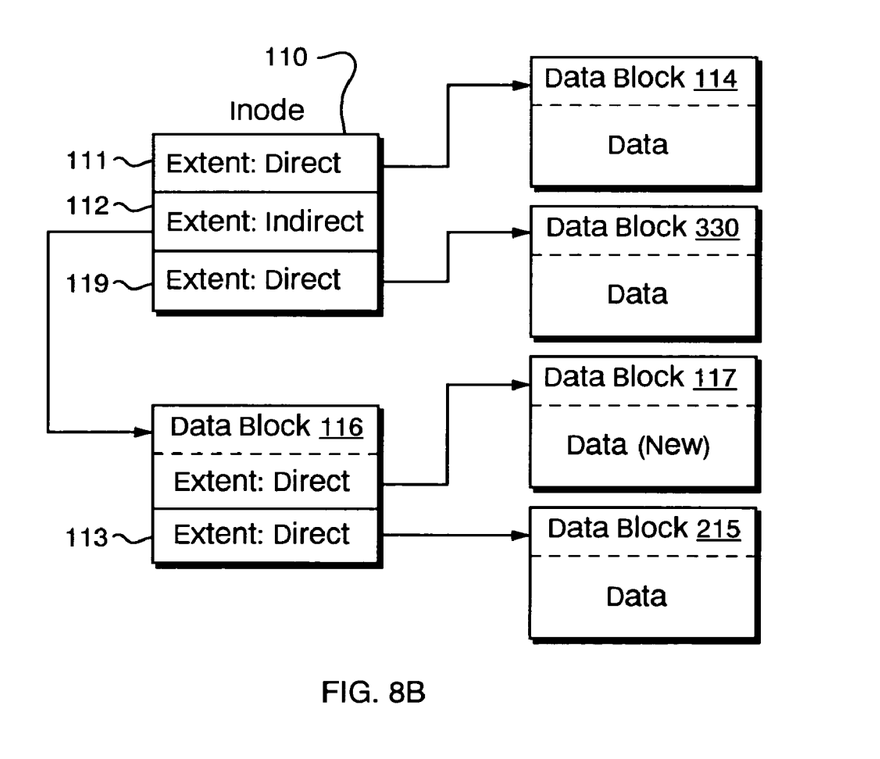

FIGS. 8A and 8B show how the operating system uses indirect extents to grow the middle of a file. FIG. 8A shows an inode 110 assigned to the file. The inode 110 has consecutive direct extents 111, 113, 119 that point to data blocks 114, 215, 330 storing originally consecutive segments of the file. FIG. 8B shows the final file in which an indirect extent 112 has been inserted between the two original direct extents 111, 119. The indirect extent 112 points to more extents stored in a data block 116. These extents, in turn, point to new data block 117 and original data block 215. Since the indirect extent 112 is physically located between the two original extents 111, 119, the segments stored in the blocks 117, 215 (indirectly pointed to) are logically located between the original segments stored in the blocks 114, 330. Inserting the indirect extent 112 has grown the middle of the associated file by logically inserting the segment in new data block 117 between the originally consecutive segments in data blocks 114 and 215.

The file system, illustrated in FIGS. 5–8B, allows any extent of an inode to be indirect, because the flag field indicates the type of each extent. This free placement of indirect extents within the inodes enables an operating system to logically insert a new data segment between any two selected data segments of a file without physically moving data blocks. To insert a new data segment, the system inserts an indirect extent into the file's inode between the two extents for the selected data segments. Then, the system makes the indirect extent point to a data block storing new direct extents that point, in turn, to the consecutive pieces of new data segment. The new direct extents are logically located in the inode at the point where the new indirect extent has been inserted.

Since the insertion of the new segments does not involve moving previously stored file segments, file expansions can be less time intensive and more convenient with the present file system than in prior art file systems. Prior art file systems that expanded files either by moving data blocks of file data or by appending file data to the end of the file often required substantial time to move previously stored data.

Figure 8C:
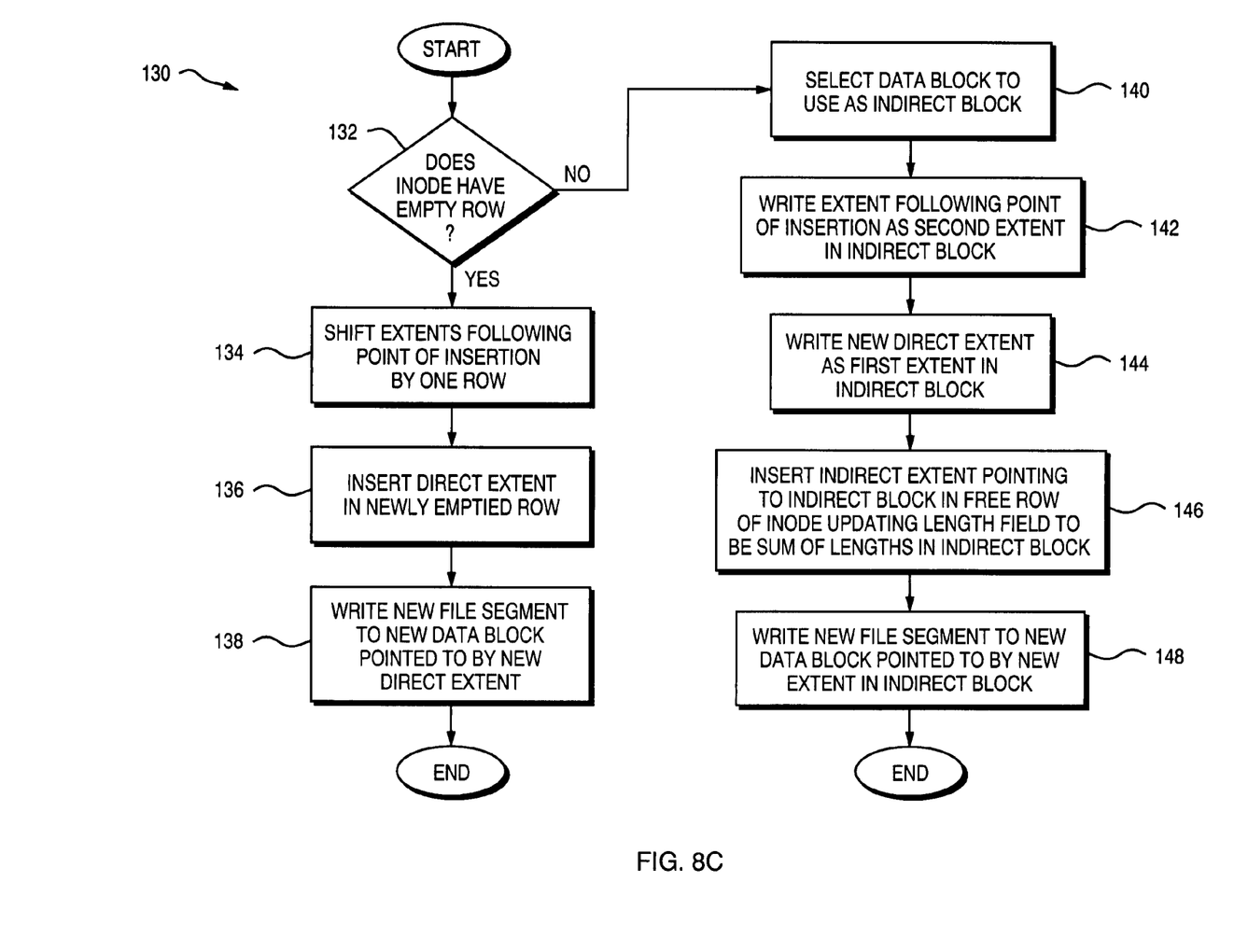
FIG. 8C is a flow chart illustrating a method of expanding a file with indirect extents.

FIG. 8C is a flow chart illustrating a method 130 of inserting a new file segment between two adjacent file segments. To insert the new segment, the operating system first determines whether at least one empty row remains for writing a new extent to the file's inode, for example to inode 110 of FIG. 8A (step 132). In FIG. 8A, the operating system would determine that the inode 110 does not have an empty row.

If the inode has an empty row, the operating system shifts down the original extents corresponding to segments that will follow the segments to be inserted by one row in the inode (step 134). Then the operating system inserts a new direct extent in the newly emptied row of the inode (step 136). Finally, the operating system writes the new file segment to a new data block pointed to by the new direct extent (step 138).

On the other hand, if the inode does not have an empty row, e.g., the case of FIG. 8A, the operating system selects a new, available, data block to use as an indirect block (step 140). In FIG. 8A, the new indirect block is the block 116. Then, the operating system writes the extent following the point of insertion to the second row of the new indirect block (step 142). In FIG. 8B, the operating system writes the extent 113 to the second row of the data block 116. Next, the operating system writes a new direct extent in the first row of the indirect block (step 144). In FIG. 8B, the operating system writes the new extent to the first row for extents in the indirect block 116.

Next, the operating system inserts an indirect extent into the row of the inode previously occupied by the extent now in the second row of the indirect block (step 146). The new indirect extent points to the new indirect block and has a length equal to the sum of the lengths of both extents in the indirect block. In FIG. 8B, the operating system writes the extent 112 pointing to the data block 116 to the inode 110. Finally, the operating system writes the new file segment in the new data block pointed to by the new direct extent (step 148). In FIG. 8B, the new file segment is written to the data block 117.

Figure 9:
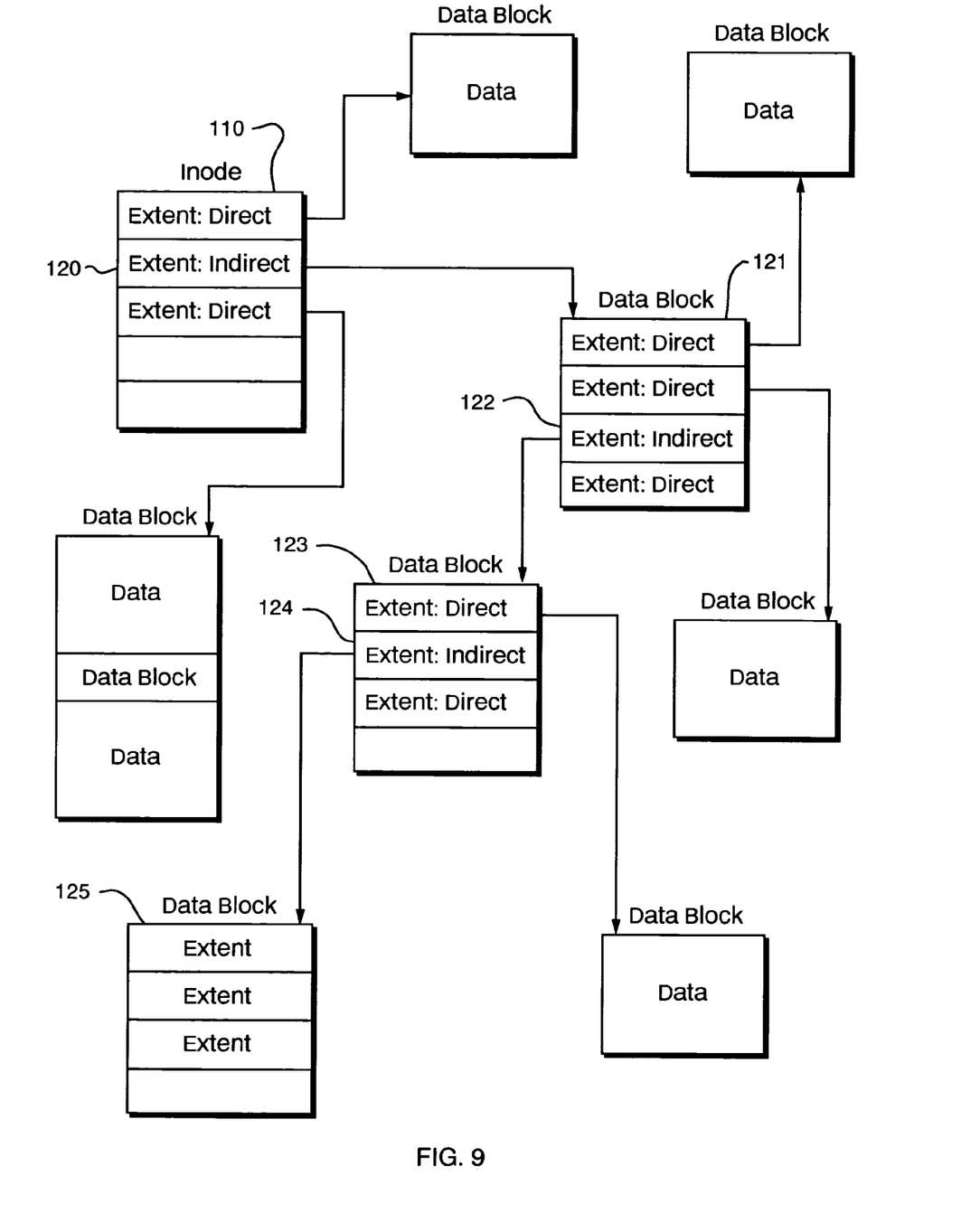
FIG. 9 is a schematic illustration of nesting of indirect extents.

FIG. 9 illustrates an example where the file system nests indirect extents. In the example, the inode 110 includes indirect extent 120, which points to data block 121. In turn, block 121 includes indirect extent 122, which points to data block 123, and block 123 includes indirect extent 124, which points to block 125.

Nesting indirect extents enables growing a file between any two original file segments without size limits. Nesting also introduces extra costs during accesses. Each access to a file segment pointed to by nested indirect extents costs extra look ups and additional look up time.

Figure 10:
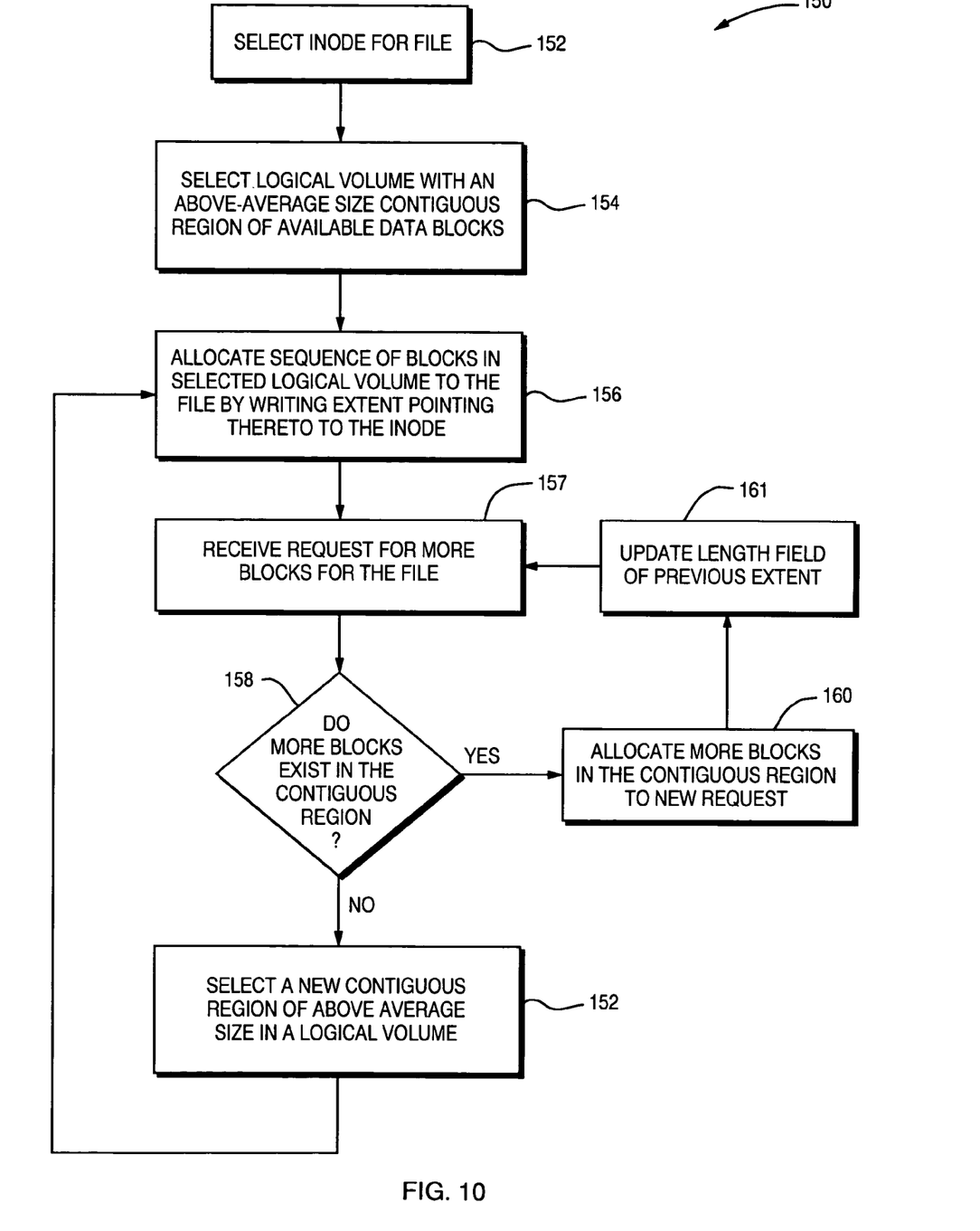
FIG. 10 is a flow chart illustrating a method of storing a file in multiple logical volumes.

FIG. 10 is a flow chart illustrating a method 150 of allocating data blocks to a file from a plurality of logical volumes, for example, the volumes LV1, LV2 shown in FIG. 5. The operating system assigns an inode to the file by writing the inode address and the file name to a row in a directory (step 152). In FIG. 5, the operating system wrote the inode address for the inode 63, in entry of the root directory 61 for file name A. The operating system selects a logical volume with a larger than average contiguous region of available data blocks (step 154). The operating system determines the maximum number of available contiguous blocks in each logical volume from data in the volume's header or from information in a superblock spanning the entire storage system. The operating system allocates a string of data blocks from the contiguous region of the selected volume to the file by writing an extent, which points to the string, in the first row of the inode assigned to the file (step 156). The extent indicates both the logical volume and an offset of the first data block of the string of blocks within the selected logical volume.

Later, a request from a software application for more data blocks for the file is received by the operating system (step 157). In response to the request, the operating system determines whether the region contiguous to the physical location of the previous segment of the file has more available data blocks (step 158). If region has more available blocks, the operating system allocates a new string of blocks immediately following the physical location previous segment, i.e., contiguous with the previous segment (step 160). Then, the operating system increases the value of the length stored in the length field of the previous extent for the region by the number of blocks in the new string (step 161). If no blocks contiguous to the previous segment are available, the operating system again searches for a logical volume with a larger than average contiguous region of available data blocks (step 162). The newly found logical volume may be a different logical volume. Thus, the new string of data blocks may be allocated to the file from a different logical volume.

In some embodiments, the allocation of more inodes is dynamic and stimulated by potential need. This dynamic allocation results in less waste of storage space by unused inodes. Dynamic allocation also implies that the physical addresses of the inodes are not predetermined. Since the physical addresses are not predetermined, separate structures record the address of each inode for use by the operating system in the event of a system failure.

Figure 11:
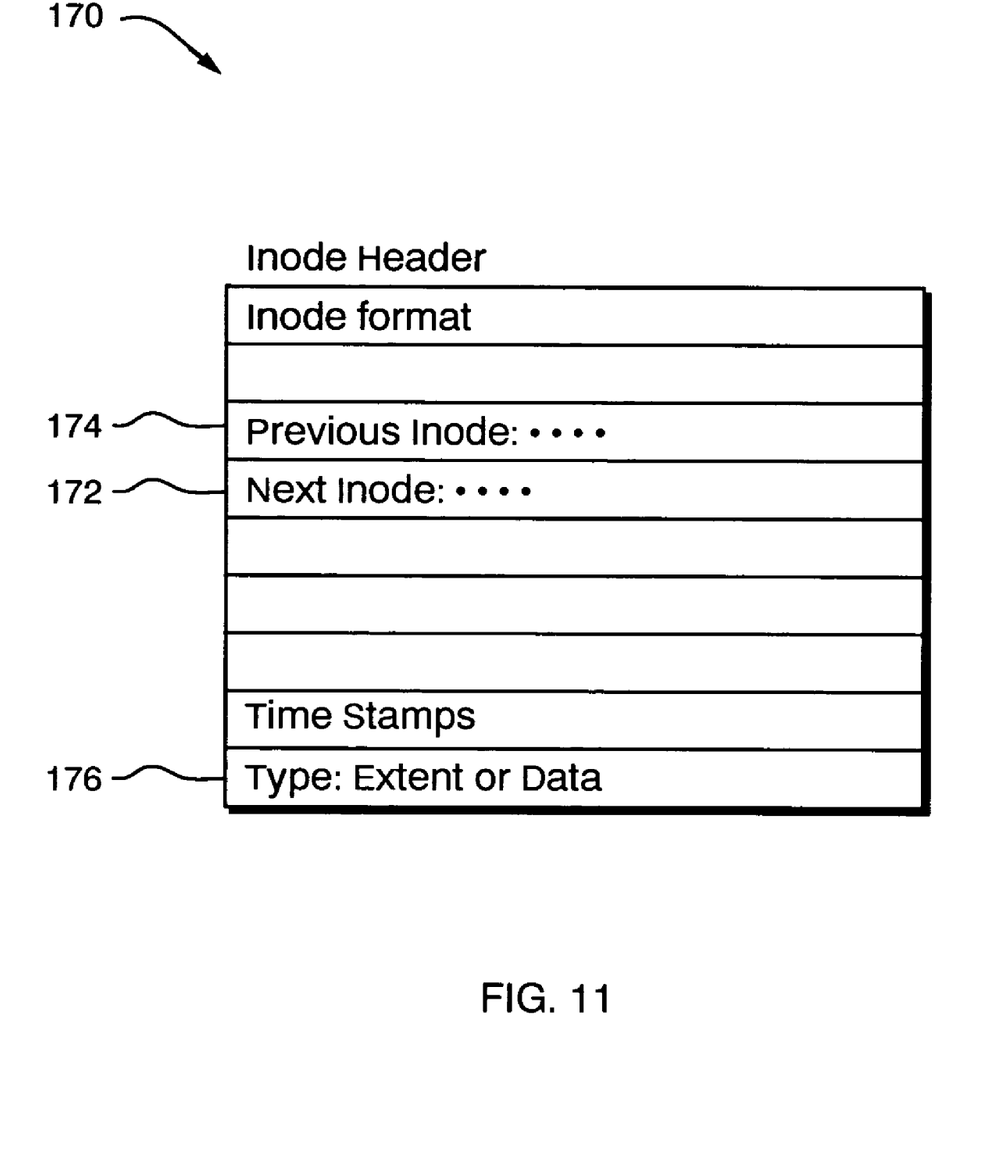
FIG. 11 illustrates one embodiment of the header of an inode.

FIG. 11 illustrates the headers 170 of one embodiment of the inodes 63, 64 of FIG. 5. The headers 170 provide the separate structures used to record the addresses of each inode. Each header 170 has entries 172, 174 for the addresses of the next inode to be allocated and of the previously allocated inode, respectively. These entries are written to the header 170 when the associated inode is first allocated.

By performing a serial chain search on the entries 172, 174 of the headers 170 of each inode, an operating system can find the addresses of each inode by using a predetermined address for the first allocated inode. The serial chain search finds inodes sequentially by hopping from found inode to found inode. After a system failure, the serial chain search enables a sequential reconstruction of the control data structures of the file system.

FIG. 11 also illustrates a entry 176 of the inode header 170. The entry 176 is binary valued and indicates whether the inode stores a data file or a list of extents. One binary value of the entry 176 indicates that the inode stores a list of extents for the associated data file, and the other binary value indicates that the inode stores the data file itself. Thus, each inode can either store a list of extents or a small data file.

The operating system writes the binary value to the third entry 176 to indicate storage of a data file when the associated inode is first created. Then, the operating system uses the inode to store the associated data file. When the size of the data file surpasses the limited space available in the inode, the operating system converts the inode to an inode for storage of lists of extents.

To perform the conversion, the operating system moves any data already stored in the inode to data blocks, writes extents in the inode to point to the data blocks, and changes the entry 176 to indicate extent storage. To store more data of the associated data file, the operating system writes more extents sequentially to the inode and stores the new data segments in the data blocks to which the new extents point.

Storing small data files in an inode directly reduces access times for data. Data retrieval from such files does not require a separate search for an inode and a data block. Thus, employing unused inodes to store small data files reduces the amount of time needed for look ups. The cost of constructing an inode that can store either a list of extents or a data file is small. The cost is one more entry in the inode's header 170.

Other additions, subtractions, and modifications of the described embodiments may be apparent to one of ordinary skill in the art.

What is claimed is:

1. A memory storage system having devices or organized in physical data blocks for physical storage of data and at least one processor including an operating system having an extent based file system for abstracting file names to the physical data blocks in the devices by assigning an inode to each file;

each inode adapted to store extents having a field to point to a logical volume, at least two of the extents being direct extents indicating a logical volume containing data blocks, a first direct extent pointing to first data blocks in the data storage devices and a second direct extent pointing to second data blocks in the data storage devices, the first direct extent indicating a different logical volume than a second direct extent;

wherein the inode further comprises at least one indirect extent pointing to third data blocks storing a third direct extent.

2. The system of claim 1 wherein each extent further includes a field to indicate whether the extent points to a block of extents or a block of data.

3. The system of claim 2 wherein each extent comprises a start address field and a length field, the start address field including a pointer to a logical volume portion and a pointer to a data block in the logical volume; and the length field fixing the number of consecutive data blocks pointed to by the extent.

4. The system of claim 3, the operating system being a UNIX based system.

5. In a memory storage device employing an operating system comprising instructions for a method for storing data files, the method comprising:

writing a plurality of extents to an inode assigned to a file, including first and second direct extents;

writing data to first and second physical data blocks, said first and second direct extents pointing to the first and second physical data blocks;

inserting an indirect extent in an inode between the first and second direct extents, the indirect extent pointing to a third physical data block; and writing at least one extent to the third physical data block, the at least one extent pointing to a fourth physical data block storing a segment of the file.

6. The method of claim 5, further comprising:

writing a length field to each extent, the length field fixing the number of consecutive data blocks pointed to by the extent.

7. The method of claim 5, the operating system being a UNIX-based system.

8. A distributed storage system, comprising:

a global cache memory;

a plurality of processors coupled to the global cache memory, each processor having a local memory for storing an operating system; and a plurality of data storage devices coupled to the global cache memory, the devices and processors capable of communicating by posting messages to each other in the cache memory, each of the devices including a processor and local memory storing an operating system, each operating system having an extent based file system for abstracting file names to physical data blocks in the devices by assigning an inode to each file;

each inode adapted to store extents having a field to point to a logical volume, at least two of the extents being direct extents indicating a logical volume containing data blocks, a first direct extent pointing to first data blocks in the plurality of data storage devices and a second direct extent pointing to second data blocks in the plurality of data storage devices, the first direct extent indicating a different logical volume than a second direct extent;

an indirect extent being inserted in the inode between the first and second direct extents, the indirect extent pointing to third physical data blocks in the data storage devices;

at least one extent being written to the third physical data blocks, the at least one extent pointing to fourth physical data blocks;

each of the first, second and fourth data blocks storing a segment of the file.

9. The system of claim 8 wherein each extent further includes a field to indicate whether the extent points to a block of extents or a block of data.

10. The system of claim 9 wherein each extent comprises a start address field and a length field,
the start address field including a pointer to a logical volume portion and a pointer to a data block in the logical volume; and,
the length field fixing the number of consecutive data blocks pointed to by the extent.

11. The system of claim 10 wherein each extent comprises a start address field and a length field,
the start address field including a pointer to a logical volume portion and a pointer to a data block in the logical volume; and,
the length field fixing the number of consecutive data blocks pointed to by the extent.

12. The system of claim 11, the operating system being a UNIX based system.

\* \* \* \* \*